3,060,189
PROCESS FOR THE PRODUCTION OF MIXTURES OF ALKALI PHTHALOCYANINES AND METAL-FREE PHTHALOCYANINE
Emil Stocker and André Pugin, Riehen, near Basel, Switzerland, assignors to J. R. Geigy A.-G., Basel, Switzerland
No Drawing. Filed Oct. 13, 1961, Ser. No. 144,835
Claims priority, application Switzerland Oct. 14, 1960
7 Claims. (Cl. 260—314.5)

The present invention concerns a process for the production of a mixture of alkali phthalocyanines and metal-free phthalocyanine.

It is known that mixtures of alkali phthalocyanines and metal-free phthalocyanine can be produced by reacting phthalonitrile with alkali metals in alcohols. A variation of this process consists in adding small amounts of sulphur or of sodium sulphide to the reaction mass before the alkali metal is added. This reaction proceeds formally according to the empiric equations:

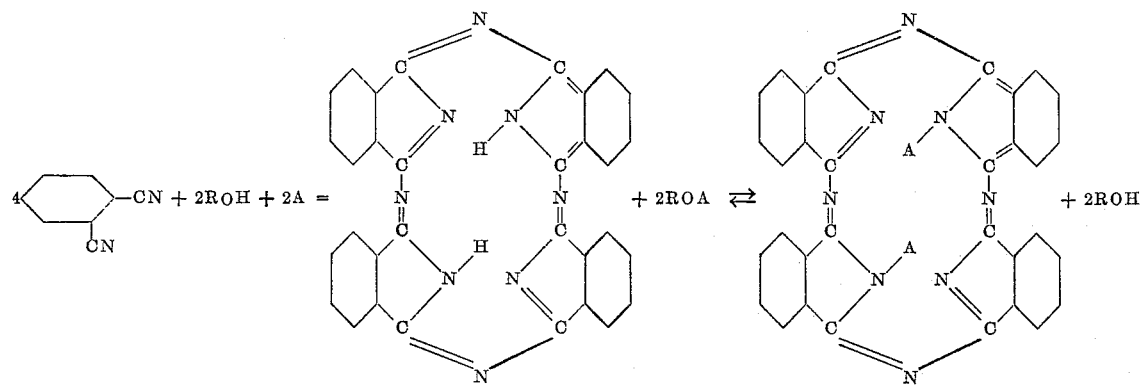

wherein A represents an alkali metal and R represents an alkyl radical, e.g. the ethyl radical. The known production process from phthalonitrile and alkali amides is also to be interpreted in the same way.

It is important in the reaction that two electrons are taken up by 4 molecules of phthalonitrile. The process thus depends on electron transference, i.e. it is dependent on reducing agent.

Whether, in the reaction system of the alkali metal/phthalonitrile/alcohol, it is the alkali metal itself or the atomic hydrogen formed as intermediary from the metal and the alcohol which acts as reducing agent is not immediately obvious and, for the question as to electron donor, is not important. It is known that both alkali metals, alkali amides and atomic hydrogen are the most active reducing agents. They easily split off an electron.

It is thus comprehensible that the processes mentioned proceed more easily and produce better yields than those which use less active reducing agents. Therefore, by the known production processes, in which phthalonitrile is reacted with an alkali alcoholate as reducing agent in the solution of the alcohol used for the alcoholate, mixtures of alkali phthalocyanines and metal-free phthalocyanine are obtained in yields which hardly exceed 50% of the theoretical. Also other reducing agents such as mercaptans, alkanolamines, acid amides or hydroquinones which have been suggested for the production of phthalocyanine from phthalonitrile, only give poor yields.

It has now been found that mixtures of alkali phthalocyanines and metal-free phthalocyanines are obtained in a pure form and good yields which even exceed those obtained by the process using alkali metal and alcohol or using alkali amide, if phthalonitrile is reacted with anhydrous alkali sulphides in the absence of alkali metals at temperatures of 100–300° C., advantageously however, at 100–150° C., particularly in the presence of solvents.

It was not to have been foreseen that the relatively weakly active alkali sulphides used as reducing agents at the relatively low reaction temperatures of about 100–150° C. would lead to this favourable result and here, apparently, have a specific action. The use of the stable alkali sulphides is both cheaper and more simple as well as less dangerous than the use of alkali metals or amides which are sensitive to oxygen and water and which require particular technical apparatus. Thus, the process according to the invention is also a substantial technical advance.

Technically, the mixture of alkali phthalocyanine/phthalocyanine is produced according to the invention by heating a mixture of phthalonitrile and alkali sulphide to about the melting point of the phthalonitrile at which point the strongly exothermic reaction begins. To counteract the heat, advantageously an inorganic salt which is inert under the reaction conditions, such as e.g. sodium sulphate or sodium chloride, possibly together with smaller amounts of inert organic compounds such as e.g. urea, the sodium salt of xylene sulphonic acid, diethylene glycol monoethyl ether or pentaerythrite, is added to the reaction mixture at the beginning.

Preferably, however, the alkali sulphide and the phthalonitrile are dissolved in an organic solvent, mainly in an ether alcohol, particularly methoxyethanol or ethoxyethanol, or in a thioether alcohol such as e.g. 2,2′-dihydroxydiethyl thioether. It is also possible to dissolve them in any proportions in a mixture of such an alcohol and an inert organic solvent, e.g. in a possibly halogenated aromatic hydrocarbon such as xylene or 1,2-dichlorobenzene. Also, formamide is a suitable solvent. During dissolution, the temperature rises quickly, the solution turns blue and the alkali phthalocyanine/phthalocyanine mixture is formed which can be converted in the known manner into metal-free phthalocyanine. The minimal amount of alkali sulphides so used is 0.5 mol to 4 mol of phthalonitrile. If the amount of alkali sulphide is raised to 0.55 to 0.6 mol, then the yield also increases. A higher content of alkali sulphides, for example 1 mol, does not cause any further increase in the yield of alkali phthalocyanine/phthalocyanine mixture; it only increases the content of alkali phthalocyanine in the mixture.

According to this invention, compounds of the general formula $A_2S_n$ are employed as alkali sulphides, in which formula A is an alkali metal in particular sodium but also it can be lithium or potassium, and $n$ is a positive whole number from one to seven inclusive, preferably one, two, three or four.

Particularly good results are attained with $Na_2S$ to $Na_2S_4$ as well as mixtures of these sulphides, whereas higher sulphides are less suitable because of their tendency to split off elementary sulphur.

The following examples illustrate the invention. In the examples, when the term "sodium sulphide" is employed $Na_2S$ is intended. Where not otherwise stated, parts are given therein as parts by weight. The temperatures are in degrees centigrade. The relationship of parts by weight to parts by volume is as that of kilogrammes to litres.

Example 1

33.8 parts of 69% sodium sulphide dried in vacuo at 160° and finely pulverised are added to a suspension of 256 parts of 100% phthalonitrile in 360 parts of glycol monoethyl ether while stirring well. The suspension first becomes yellow, then green and finally blue and the temperature rises of its own accord to about 80°. When the temperature drops, external heating is applied to 130° and this temperature is kept for 3 hours.

To hydrolyse the sodium phthalocyanine formed, 500 parts of water and 100 parts of 30% caustic soda lye are added and the mixture is heated for 2 hours at 100° while stirring well. The suspension is filtered hot and the residue is washed with hot dilute caustic soda lye and then with hot water. After drying, 216 parts of pure metal-free phthalocyanine are obtained.

Example 2

12 parts of sodium hydroxide and 14.4 parts of sulphur are dissolved at 100° in 200 parts of glycol monomethyl ether. 128 parts of 100% phthalonitrile are added at 50° to the solution of sodium tetrasulphide formed and the mixture is heated for 2 hours at 123° whereupon it becomes blue and more viscous.

To hydrolyse the sodium phthalocyanine formed, 250 parts of water and 50 parts of 30% caustic soda lye are added to the suspension and the mixture is heated for 2 hours at 100°. After filtering, washing the residue with dilute caustic soda lye and hot water and drying, 103 parts of metal-free phthalocyanine are isolated. It is somewhat less pure than that obtained according to Example 1.

If in this example, instead of 12 parts of sodium hydroxide, equivalent amounts of lithium hydroxide or potassium hydroxide are used, then the metal-free phthalocyanine is obtained in similarly good yields.

Example 3

205 parts of 100% phthalonitrile and 23 parts of 69% sodium sulphide which has been dried in vacuo at 160° and finely pulverised, are added to 200 parts of o-dichlorobenzene and 20 parts of glycol monoethyl ether and the whole is heated for 3 hours at 150°. The o-dichlorobenzene is then removed from the deep blue suspension by steam in the presence of 150 parts of 30% caustic soda lye. After filtering off, washing with hot water and drying, 180 parts of pure metal-free phthalocyanine are obtained.

Example 4

51.2 parts of 100% phthalonitrile and 7.8 parts of 69% sodium sulphide are heated in 75 parts of formamide for 2½ hours at 120–125°. A very thick paste is formed which afterwards is diluted with water, boiled and filtered. To further purify, the sodium phthalocyanine obtained as filter residue is extracted with hot dilute caustic soda lye. After filtering off, washing and drying, 38 parts of metal-free phthalocyanine are isolated.

In this example, if instead of formamide, 100 parts of thiodiglycol are used, then 32 parts of metal-free phthalocyanine are obtained.

Example 5

108.4 parts of 100% phthalonitrile and 10 parts of 69% finely pulverised sodium sulphide are heated in 300 parts of glycol monoethyl ether for 2 hours at 130°. The suspension is filtered hot and the residue washed with glycol monoethyl ether and water. After drying, 90 parts of sodium phthalocyanine are isolated. To hydrolyse, this is heated in 400 parts of methyl alcohol for 5 hours under reflux. After filtering off, washing with hot water and drying, 84 parts of metal-free phthalocyanine are obtained.

Example 6

102.4 parts of 100% phthalonitrile, 200 parts of anhydrous sodium sulphate and 45 parts of 69% anhydrous sodium sulphide are mixed and then ground into a finely granular powder. This powder is put into an oven previously heated to 200° and baked for 20 minutes. An exothermic reaction occurs and the temperature of the mixture rises to 234°. It is then finely pulverised in a mill and extracted with hot dilute caustic soda lye and afterwards with hydrochloric acid in the presence of Turkey red oil. In this way 60 parts of metal-free phthalocyanine of good purity are isolated.

The yield of metal-free phthalocyanine can be increased to 70 to 80 parts if in this example, 40 parts of the sodium salt of xylene sulphonic acid or 40 parts of pentaerythrite or 20 parts of diethyleneglycol monoethyl ether are added to the phthalonitrile.

What we claim is:

1. Process for the production of mixtures of alkali phthalocyanines and metal-free phthalocyanine comprising reacting phthalonitrile with anhydrous alkali sulphides of the formula $A_2S_n$ wherein A is an alkali metal and n is a positive whole number of from 1 to 4 inclusive, at a temperature between 100 and 300° C.

2. Process according to claim 1 wherein the alkali sulphide is $Na_2S$.

3. Process according to claim 1 wherein the reaction is carried out in an organic solvent.

4. Process according to claim 3 wherein the organic liquid is glycol monoalkyl ether and the alkali sulphide is $Na_2S$.

5. Process according to claim 3 wherein the organic liquid is a mixture of o-dichlorobenzene and glycol monoalkyl ether and the alkali sulphide is $Na_2S$.

6. Process according to claim 1 wherein the reaction is carired out in the presence of an inorganic salt.

7. Process according to claim 6 wherein the inorganic salt is anhydrous sodium sulphate and the alkali sulphide is $Na_2S$.

References Cited in the file of this patent

UNITED STATES PATENTS

| | | |
|---|---|---|
| 2,124,419 | Heilbron et al. | July 19, 1938 |
| 2,699,441 | Wettstein | Jan. 11, 1955 |